US00RE34332E

United States Patent [19]

Adams et al.

[11] E Patent Number: Re. 34,332

[45] Reissued Date of Patent: Aug. 3, 1993

[54] ASSEMBLY FOR CONNECTING MULTI-DUCT CONDUITS

[76] Inventors: Robert Adams, 5248 Hearst Ave., Metairie, La. 70001; Andrew J. Cousin, 5333 Canary Ansas La., Kenner, La. 70065

[21] Appl. No.: 703,390

[22] Filed: May 21, 1991

Related U.S. Patent Documents

Reissue of:

[64] Patent No.: 4,834,825
Issued: May 30, 1989
Appl. No.: 98,856
Filed: Sep. 21, 1987

[51] Int. Cl.[5] ..... F16L 39/00

[52] U.S. Cl. ..... 285/137.1; 138/108; 138/111; 138/112; 138/113; 138/155; 174/95

[58] Field of Search ..... 285/18, 22, 23, 24, 285/25, 28, 31, 33, 39, 108, 137.1, 137.2, 379; 138/111, 112, 155, 108, 113; 156/94, 293, 304.2, 304.3, 294; 29/468, 455.1; 277/207 A; 174/95, 96, 99 R

[56] References Cited

U.S. PATENT DOCUMENTS

| | | | |
|---|---|---|---|
| 337,624 | 3/1886 | Schillinger | 174/95 |
| 528,291 | 10/1894 | Cummings | 285/137.1 |
| 990,070 | 4/1911 | Sheldon | 285/25 |
| 1,541,756 | 6/1925 | Williams | 285/138 |
| 2,890,899 | 6/1959 | Simmons et al. | 285/137.1 |
| 3,469,863 | 9/1969 | Riester et al. | 285/379 |
| 3,503,634 | 3/1970 | Cadiou | 285/137.1 |
| 3,590,855 | 7/1971 | Woollen | 138/111 |
| 3,606,395 | 9/1971 | Salerno et al. | 174/96 |
| 3,811,711 | 5/1974 | Tarkenten | 277/207 A |
| 3,872,894 | 3/1975 | Streit | 138/155 |
| 4,377,291 | 3/1983 | Albertini | 285/137.1 |
| 4,382,619 | 5/1983 | Grisebach | 285/137.1 |
| 4,478,436 | 10/1984 | Hashimoto | 285/137.1 |
| 4,592,426 | 6/1986 | Neely | 285/137.1 |
| 4,630,847 | 12/1986 | Blenkush | 285/137.1 X |
| 4,688,831 | 8/1987 | Viehmann | 285/137.1 |
| 4,865,354 | 9/1989 | Allen | 285/137.1 |
| 5,078,432 | 1/1992 | Seiter | 285/137.1 |
| 5,135,265 | 8/1992 | Bouscher et al. | 285/137.1 |
| 5,137,306 | 8/1992 | Flood | 285/137.1 |

FOREIGN PATENT DOCUMENTS

| | | | |
|---|---|---|---|
| 533285 | 11/1956 | Canada | 285/39 |
| 134569 | 11/1950 | Fed. Rep. of Germany | 174/96 |
| 2531848 | 2/1977 | Fed. Rep. of Germany | 285/137.1 |
| 773671 | 11/1934 | France | 285/137.1 |
| 156805 | 10/1979 | Netherlands | 285/137.1 |
| 7216 | of 1903 | United Kingdom | 138/111 |
| 1104047 | 2/1968 | United Kingdom | 285/110 |
| 1315190 | 4/1973 | United Kingdom | 285/379 |

OTHER PUBLICATIONS

Pro-Opt Brochure, Published by Conduit Technology, Inc., Flushing, N.Y. (1984).

Foduct Brochure, Published by Lof Plastics, Troy, Michigan, (Date Unknown).

Wavin Mr. Brochure (Date Unknown).

Photos of 1985 Dyka coupling.

The George-Ingraham Corp. FO-COM VI Installation Instructions.

The George-Ingraham Corp. FO-COM II Installation Instructions.

The George-Ingraham Corp. FO-COM Installation Instructions.

The George-Ingraham Corp. Catalog No. 287FO (1987).

The George-Ingraham Corp. Catalog No. 386FO (1985).

The George-Ingraham Corp. Catalog No. 485FO (1985).

Can*Tex Industries Tel-Quad PVC Fiber Optic Telephone Duct Brochure, Price List, and Installation Instructions.

Perma-Pipe brochure about Therm-O-Seal Insulated Underground Thermal Distribution System (May 1978).

Permanent Piping Systems Division Drawing dated Mar. 28, 1978 of Coupling Detail for Copper O Ring System.

Dyka Multiduct Brochure, Dyka U.S.A., Inc. Macon, Ga. 31297 (Date Unknown).

*Primary Examiner*—Michael W. Ball
*Assistant Examiner*—Steven D. Maki

*Attorney, Agent, or Firm*—Pravel, Hewitt, Kimball & Krieger

[57] ABSTRACT

An assembly for the coupling of a multi-duct conduit system for sealing the outer and inner ducts of adjacent conduit sections in end to end relationship. There is provided a primary coupling housing which includes preferably a premolded body portion which is insertible into the outer most housing of a ducted system. The body system in the body portion comprises first and second half body portions. Each first and second half body portion is adapted to receive a plurality of ducts into bores in the body housing so that a first plurality of ducts enters and is insertible into the body portion at a first end and the second adjoining plurality of duct members are insertible into the body portion on the second end, the first and second portions of ducts being slidably engaged into the body portion and meeting substantially at a center point within the body portion, for defining a continuous pathway within the ducts for housing transmission lines therewithin.

7 Claims, 5 Drawing Sheets

ASSEMBLY FOR CONNECTING MULTI-DUCT CONDUITS

Matter enclosed in heavy brackets [ ] appears in the original patent but forms no part of this reissue specification; matter printed in italics indicates the additions made by reissue.

BACKGROUND OF THE INVENTION

1. Field of the Invention

The system of the present invention relates to multi-duct conduit systems. More particularly, the apparatus of the present invention relates to an assemblage for interconnecting ducts within a multi-duct conduit system particularly adapted for housing underground cable installations. The system would serve as a coupling arrangement to sealingly couple adjacent conduit sections end to end to form the continuing underground conduit system.

2. General Background

For certain transmission systems, wherein cables are laid underground, such as the light guide cables used in the transmission of telephone lines, in the normal installation of the system, the cables are housed through a light duct work, the ducts laid out in 20 to 30 foot sections, and in certain installations the ducts may appear in groups of three to four each duct housing a number of cables, and the ducts assembled as a group in order to house sufficient cable for the transmission.

Normally, the individual ducts housing the cable are then secured within an exterior main [husings] *housing* such as light-weight PVC pipe, so that the multi-duct housing are contained within a central housing for easier laying of the installation underground.

One of the recurring problems in this particular type of system is that the points at which the 20 to 30 foot lengths of interior housing must be coupled or joined so that the line may be continuously transmitted underground. This juncture, of course, must, in order to be suitable, be of such a nature that the ducts within the outer housing are coupled in such a way, of course, to provide a suitable connection between the ducts, and yet for the most part, be free of moisture and the exterior corrosive elements underground.

There are several products presently utilized in the marketplace, which attempt to provide for the proper coupling arrangement between ducts end to end, but fall short of their goal. One such coupling is the coupling manufactured by Dyka U.S.A., Inc., wherein the coupling includes an outer duct with the inner ducts positioned within the outer duct. There is included a coupling member wherein the inner ducts are fed into a support plate with each socket in the support plate accommodatng a duct with a flexible gasket so that when the inner ducts are positioned in the coupling, the gaskets form a seal about the inner ducts during use. There is further provided a member to engage between the support plates to maintain the coupling in an overall coupled position.

In one embodiment there is further included an exterior collar member positioned around the juncture of the outer most casing to secure the outer most casing into sealing relationship. This arrangement falls short of providing a stable, secure joint, and often results in unsecure coupling of the segments of the housings.

SUMMARY OF THE PRESENT INVENTION

The assembly of the present invention solves problems and introduces an improved coupling system over what is presently in the art. What is included in an assembly for the coupling of a multi-duct conduit system for sealing the outer and inner ducts of adjacent conduit sections in end to end relationship. There is provided a primary coupling housing which includes preferably a premolded body portion which is insertible into the outer most housing of a ducted system. The body system in the body portion comprises first and second half body portions. Each first and second half body portion is adapted to receive a plurality of ducts into bores in the body housing so that a first plurality of ducts enters and is insertible into the body portion at a first end and the second adjoining plurality of duct members are insertible into the body portion on the second end, the first and second portions of ducts slidably engaged into the body portion and meeting substantially at a center point within the body portion, for defining a continuous pathway within the ducts for housing transmission lines therewithin. The body member further includes an interior gasket within each bore for sealibly engaging the interior duct members as they slidably engage therewithin. There is further included an exterior gasket member around the [end] end portion of the exterior body so that when the exterior body is slidably engaged within the exterior housing, the gasket member is such that it engages the inner wall of the housing and eliminates any movement out of the housing of the body portion once engaged therewithin. There is further provided means within the center juncture of the inner conduits, so that the wall portions of the inner conduits and the center juncture provides a flush surface for the continuous housing of transmission lines therethrough. Further [includes] *included* may be a plurality of spacer elements attachable to each of the inner conduits in their travels within the principal conduit between the coupling assembly to maintain the conduits in spaced apart relationship within the outer housing.

[An additional embodiment would provide a splice element for a rupture in the conduits body which is insertable into a first portion of the splice and slidably positioned to provide an internal body portion across the splice.]

Therefore, it is a principal object of the present invention to provide a coupling system for transmission lines which is sufficiently sturdy to securely engage the end portions of adjacent line conduits therewithin:

It is still a principal object of the present invention to provide a coupling for adjacent transmission line housings end to end, which through a single body portion provides a secure housing for the line housings therewithin so that there is no potential for break in the system at the point of connection;

It is still a further object of the present invention to provide a connector assembly with substantially a single piece integral body section insertible into an outer housing, wherein adjacent ends of joining conduits are inserted therein and the system securely placed within the outer housing so that little or no movement occurs which may result in uncoupling of the conduits;

[It is still a further object of the present invention to provide a coupling system for transmission lines conduits, which can be easily insertible in a rupture point in the line, with simple insertion of the system into the exterior housing and the coupling of adjacent conduits therewithin.]

DETAILED DESCRIPTON OF THE PREFERRED EMBODIMENT:

The preferred embodiment of the system of the present invention is illustrated in FIGS. 1-4 as being directed towards a system for interconnecting the end segments 32 of a plurality of transmission line conduits 12 so that the individual segments of conduits 12 upon being interconnected define a continuous housing over a predetermined distance for preferably underground transmission cables or the like. As seen in the FIGURES the transmission of underground cables can be accomplished by threading the transmission lines through a plurality of interior conduits 12, for housing the transmission lines through bore 14 within conduits 12.

Figure 2:
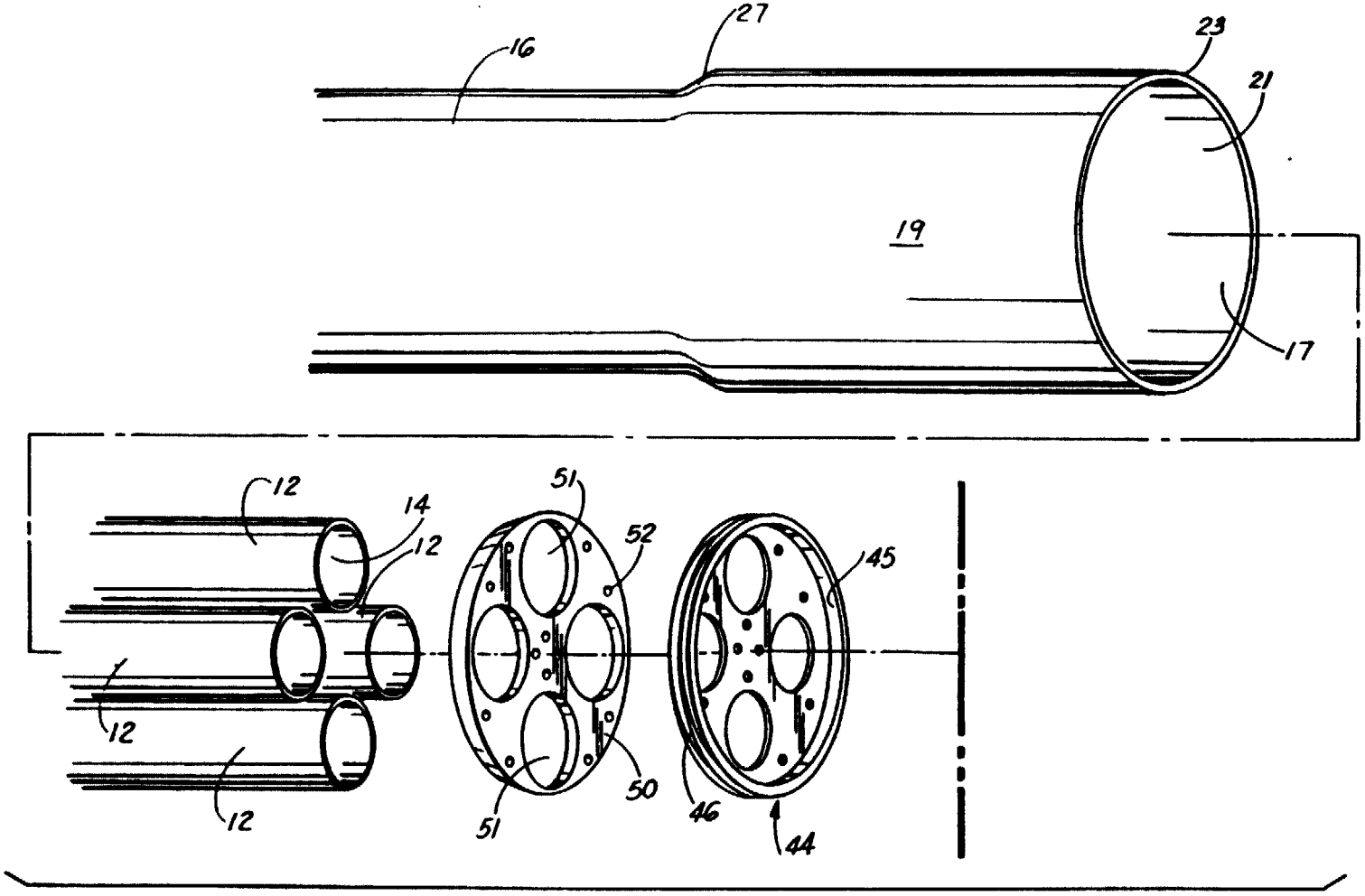
FIG. 2 is a continuation of FIG. 1, illustrating the insertion of the components insertible into the second half of the body system.
Figure 4:
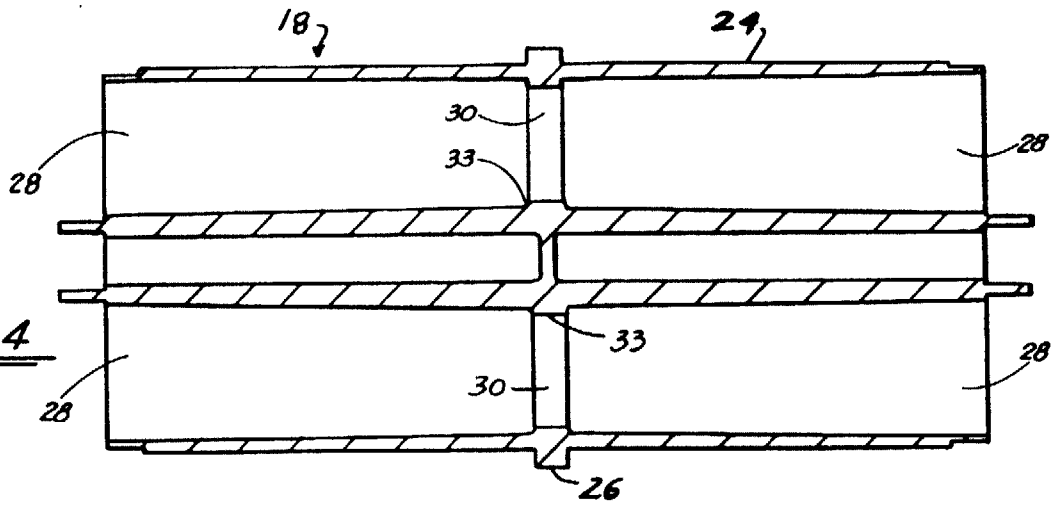
FIG. 4 is a cross-sectional [respresentational] *representational* view of the coupled system of the present invention

For purposes of this discussion, and as is often very common in the art, inner conduits 12 are grouped in groups of 3 or 4 and for our purposes we shall designate four conduits as being the appropriate groups. The conduits 12 as seen in FIG. 2 are then contained within a principal exterior casing 16 which is of substantially the same length as conduits 12, and serve as a means for protecting the inner conduits 12 and providing an exterior housing to confine the individual inner conduits 12 within casing 16 over the length of the line. For purposes of construction, for the most part, conduits 12 and casing 16 are constructed of lightweight flexible material such as PVC or plastic, and serve as an excellent insulation and housing for transmission lines through bore 14.

Figure 3:
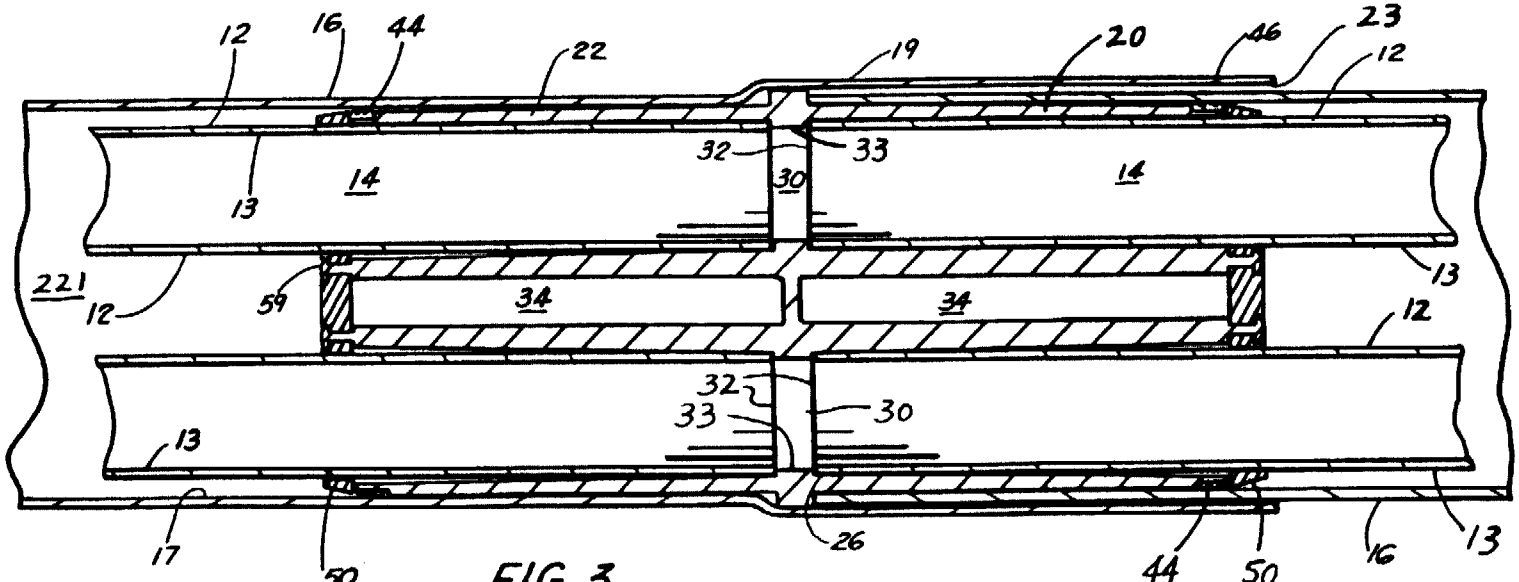
FIG. 3 is an overall view of coupled conduits within the body portion housed within the exterior main housing.

As was addressed earlier in the application, the present invention provides a system for coupling adjacent groups of conduits 12 in those instances where a group of conduits 12 mates with an adjacent group of conduits 12 to form the continuous transmission channel 14 as seen in FIG. 3. This coupling system is better defined in FIGS. 1 and 2 in exploded view. What is provided in this system is a main coupler body member 18 which preferably would be a molded body portion being of a substantial length, the body portion being divided in a first half body portion 20 and a second half body portion 22, each of the half-body portions 20 and 22 defining a means for receiving a plurality of adjacent ends of conduits 12 therewithin for interconnecting the conduits 12 within body member 18 as seen in FIG. 3. Body member 18 FIGS. 1 and 4 would comprise a continuous molded wall portion 24 having an exterior centrally located mounting ring 26, the purpose of which will be discussed further. Internally, body member 18 contains a plurality of bores 28, each bore 28 being substantially the circumference of the outer diameter of conduits 12, and with bores 28 running throughout the length of body member 18 and meeting at a common central point 30 therewith which would define a stop means for engaging the end 32 of each inner conduit 12 as seen in FIG. 3. For purposes of construction, stop means 30 would simply comprise a raised wall within the bore 28 having a shoulder portion 33, of substantialy equal thickness to the wall 13 of inner conduits 12, so that when in position within body member 18 and the end 32 of conduit 12 engaging stop 30, the wall 13 of inner housing 12 and the raised stop 30 provides a continuous wall portion between one adjacent set of conduits 12 and the second adjacent set of conduits 12 that are engaged within the [confined] *confines* of body portion 18. Of course, for purposes of construction, the plurality of bores 28 within body member 18 would coincide precisely with the configuration of the inner housings 12 as seen in the FIGURES. It should be noted also that in order to provide for a more lightweight construction of body member 18, there are provided void spaces 34 within body member 18 so that material which would not necessarily be needed in the construction of body portion is eliminated.

One of the primary concerns in the construction of adjacent segments of inner conduits 12, when joined end to end, is the requirement that the inner conduits 12, once inserted into the bores 28 of body member 18, remain firmly engaged so as to prevent any slippage of the conduits 12 during assemblage. Likewise, it is necessary that the entire connector assembly, once housed within external housing 16, be likewise secured so that no slipping occurs.

In addressing these problems, the present invention further provides means for securely engaging the inner conduits 12 within bores 28 once in position, likewise for engaging body member 18 within exterior casing 16. This means would include a principal gasket member 44, which is comprised of rubberized flexible material which is positioned around a reduced neck portion 40 and 42 on both first and second ends respectively of body member 18. The gasket member 44 would include an inner surface 45 for making contact with the surface 47 of neck portions 40 and 42, with the outer surface of gasket member 44 comprising a series of raised ring member 46 to serve as a means for grippingly contacting the inner surface 17 of exterior housing 16 as seen in FIG. 3. In order to accommodate and securely fasten gasket member 44 onto body member 18, there is further provided an end plate member 50, having a series of bores 51 which coincide with the interior bores 28 of body member 18, with an end plate 50 being positioned into each end face 55 of body member 18 for final construction of the principal connection member. End plate 50 is maintained on body portion 18 via a plurality of molded pegs 54 which extend outwardly from face 55, and are of a substantial greater length than thickness of plate member 50. Likewise, plate member 50 has a corresponding number of bores 52 for accommodating the pegs 54 therewithin. Following the positioning of gasket member 44 on surface 47, end plate 50 is slidably engaged upon peg members 54, and once in position, the [largered] *larger* diameter end plate 50 maintains gasket 44 in place as seen in FIG. 3. Once in position, pegs 54 will extend a distance out from bores 52, and upon being sonically treated or the like, pegs 54 would be flared outwardly to form a head portion 59 which would securely hold plate member 50 in position as seen in the FIG. 3.

This positioning of gasket member 44 on both neck portions 40 and 42 of member 18 assures that when member 18 is positioned within casing 16, the outer flexible ridges 46 of gasket member 44 engage the inner wall 17 of casing 16 in such a fashion that when an attempt would be made to pull casing 16 out of engagement with the outer wall of body member 18, gasket 44 would securely hold it in place and therefore assure that no slipping and sliding would occur between the connection system.

Figure 5A:
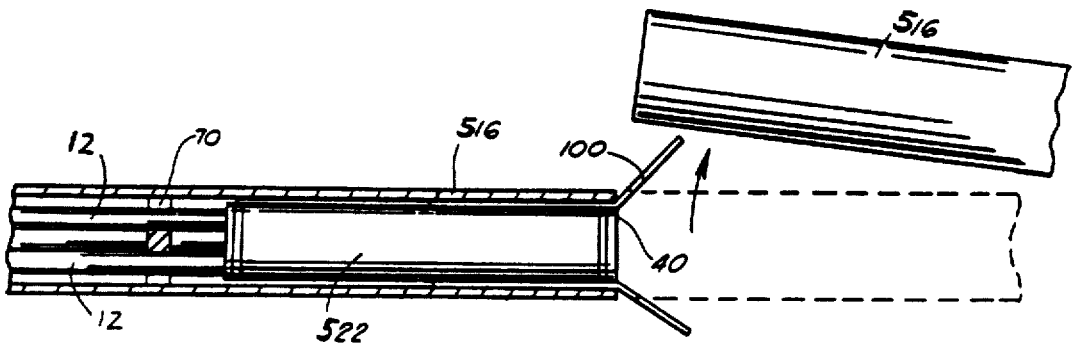
[FIGS. 5A through 5C illustrate the embodiment of the invention utilized in the process to repair breaks in the overall body of the length of a conduit.]
Figure 5B:
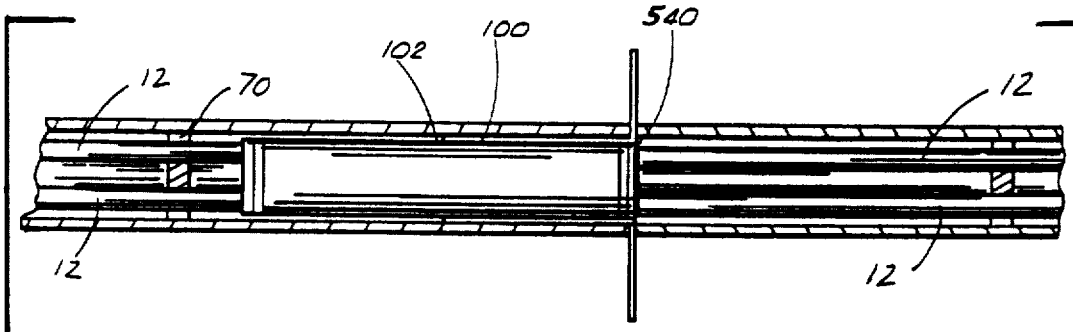
Figure 5C:
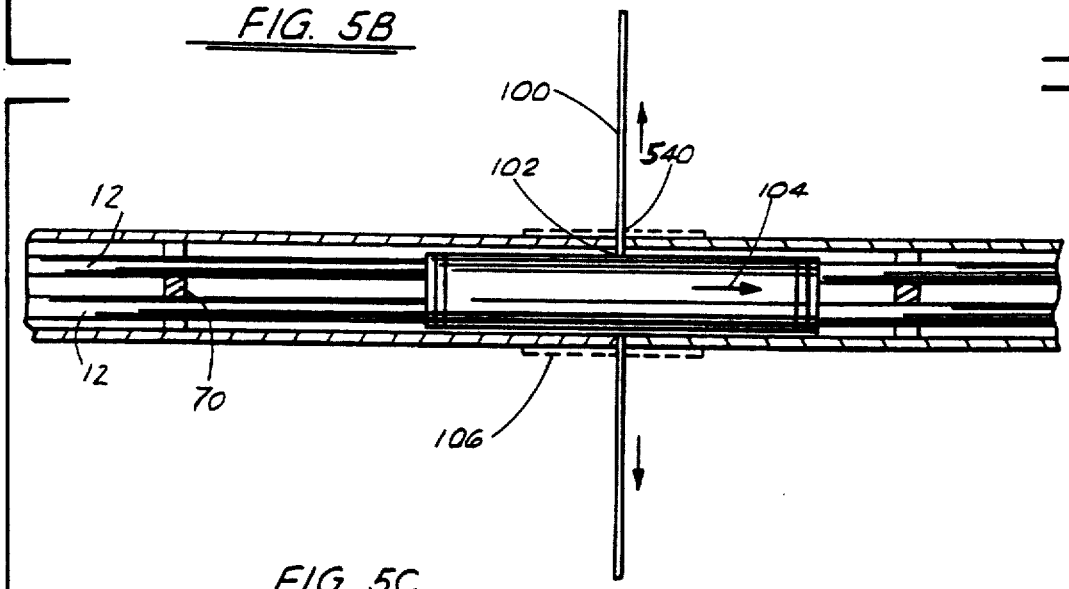
Figure 5:
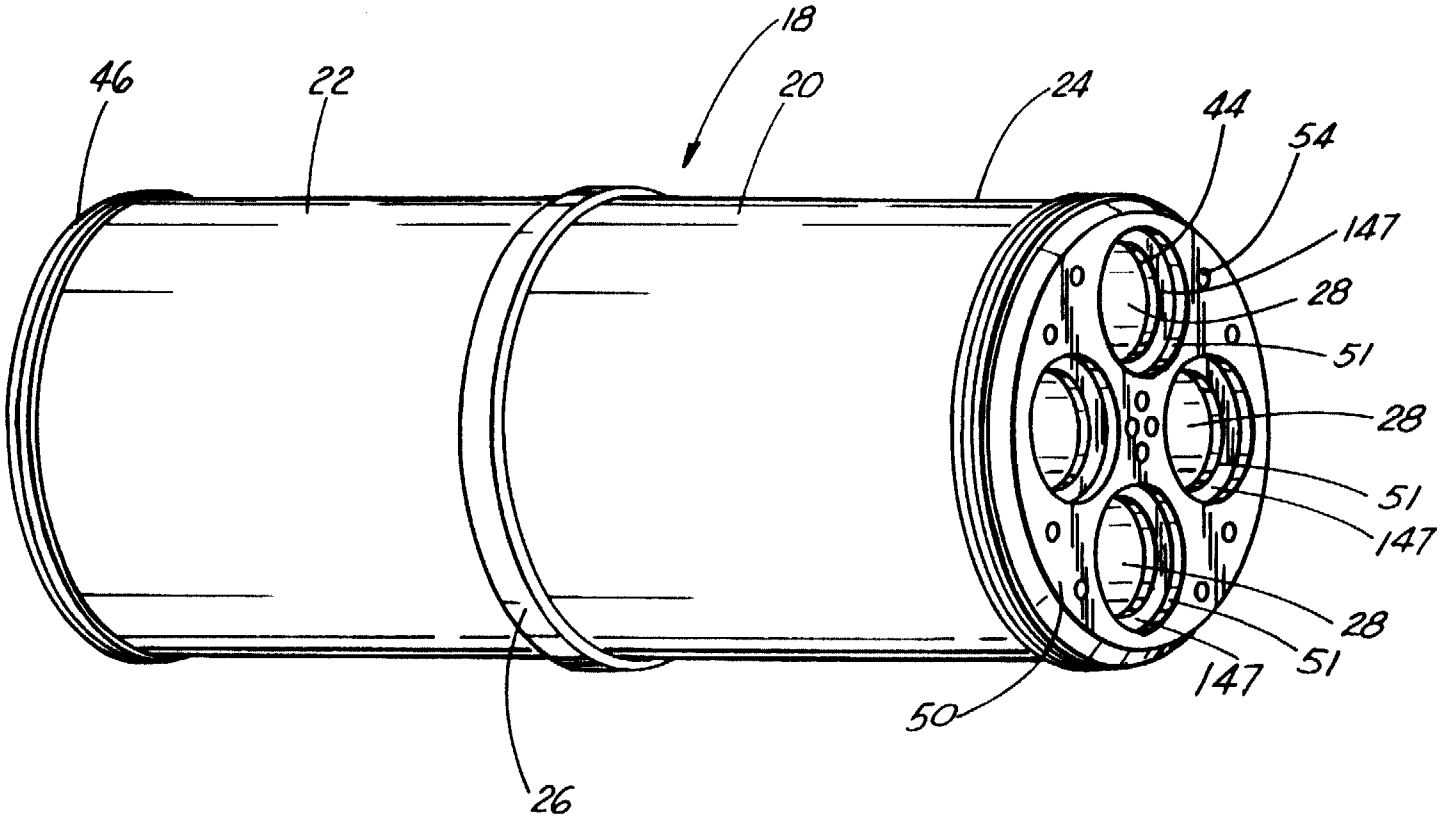
*FIG. 5 is a perspective view of the body member of the present invention.*

*Flexible gasket member 44 is deformable and overlaps bores 51, creating a number of inner gaskets 147 adjacent the ends of bores 28 (see FIG. 5). Inner gaskets 147 act as sealing means between conduits 12 and bores 28 of body member 20. Inner gaskets 147 are thus axially positioned between bores 28 and bores 51. Bores 28 and bores 51 act as receiving means for receiving conduits 18. The flexible inner gaskets 147 would be transversely secured at the end of the body member 20 having a respective opening correspondingly concentric with each of the body member bores 28 such that each respective opening has a diameter smaller than the corresponding bore for providing seals between the body member 20 and the conduit 12, with the flexible gasket also having a diameter larger than the outside diameter of the body member for providing a seal between the body member 20 and the casing. See FIG. 5.*

Figure 1:
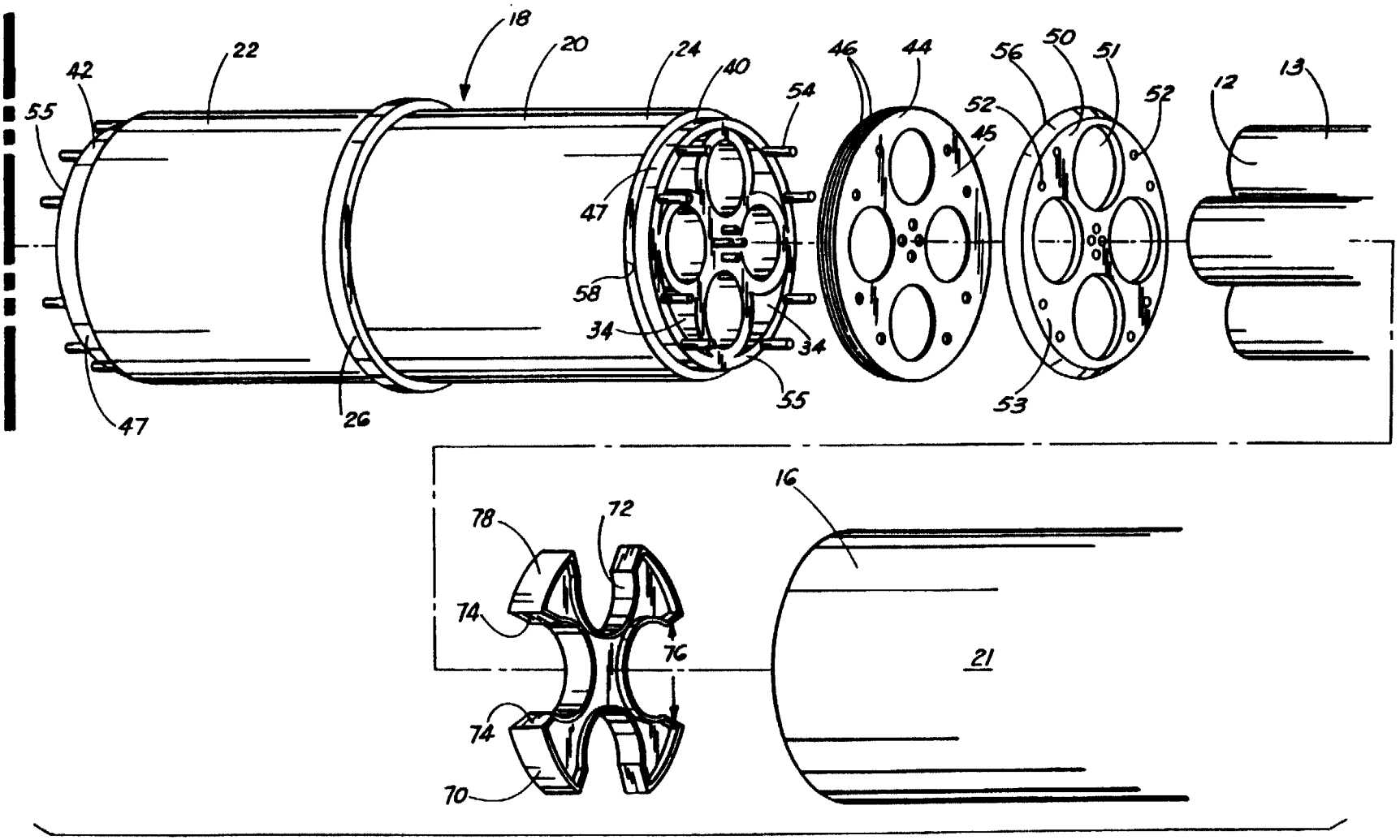
FIG. 1 is an overall exploded view of the components of the connector system insertible into the first half of the body portion.

For purposes of illustration, FIG. 2 illustrates the corresponding plate member 50 and gasket member 44 would be securely engaged upon the second end 42 of housing 18, therefore when viewing FIG. 2 as a continuation of FIG. 1, one is able to substantially see how both ends of housing 18 would be accommodated with such a gasket 44 and end plate 50 for a complete assembly of the housing unit on body portion 18 for use with inner conduits 12.

Also it should be noted for purposes of illustration as seen in FIG. 2 that due to the assemblage of casing 16, that portion of casing 16 which would be slidably engagable upon the second half-body portion 22 of body member 81 includes a first enlarged area 19, which is constructed to slidably engage over the end section [21] *121* of casing 16 that it will be slidably engaged over first half-body portion 20 of body member 18. Therefore, as seen in FIG. 3, upon slidably engaging body portion 221 through the principal bore 21 of casing 16, the body portion 22 would be slidably engaged to a position past the enlarged portion [12] *19* of outer casing 16, with exterior ring member 26 engaging the curved shoulder portion 27 of casing 16, so that body member 18 can be secured no further into casing 16, yet there is sufficient space between the wall 20 and the interior surface 23 of enlarged portion 19, so that the second length of casing 16 can be slidably engaged within the annular space between surface 23 and outer wall 20 of member 81 as seen in FIG. 3. *Each conduit assembly has a plurality of smaller conduits 12 disposed in a large integral exterior casing joint 16, casing joint 16 having a bell end and a spigot end, with a first enlarged area or bell end portion 19 adjacent the bell end and a spigot end portion 121 adjacent the spigot end for connecting with adjacent joints of casing 16 to form bell-and-spigot connections.*

For purposes of the constructed unit, reference is made to FIG. 3. As seen in FIG. 3, member 18 has securely engaged thereupon, on both its end faces 55, plate member 50 with gasket 44 secured therebetween. Likewise, inner conduits 12 have been slidably engaged within bores 28 so that together with inner stop 30 they provide a continuous transmission channel 14 for transmission lines therewithin. Following the engaging of inner conduits 12 therewithin, casing 16 with broad end 19 is slipped upon body member 18 to a position where a stop member or outer collar 26 has engaged shoulder 27 so that the first casing 16 is secured thereupon. Following that, a second casing 16 is positioned in the annular space between the interior surface 25 of enlarged portion 19 and the outer surface 20 of body member 18, to a point where the end of second casing 16 engages a second face of collar 26 to assure that the system is properly assembled at that juncture of the inner conduits 12.

Since, as stated earlier, the inner conduits 12 are of some length, the system might further provide a plurality of spacer units 70 (see FIG. 1), each of the spacer units 70 being provided with an interior engaging means 72 defined by a circular wall portion, having a pair of end portions 74 with a space 76 therebetween, so that each of the four conduits 12 may be snappingly engaged along wall portions 72 and held in place by end portions 74 so that the conduits 12 are maintained spaced apart. For purposes of being secured, the spacing member 70 has four outer faces 78 which are the identical inner diameter of the wall of casing 16, so that the spacer 70 fits securely engaged along the inner surface 17 casing 16 in position.

Preferably in construction, spacer 70 would be placed in position along the length of inner conduits 12, the number of spacers 70 along that length as needed, and once engaged would then be slidably accommodated within casing 16 prior to the placement of the main coupling system on each end thereupon.

[FIGS. 5A and 5C illustrate the use of a modified body member 522 being utilized in a specific circumstance in the installation and repair of underground housing for transmission lines. What often occurs following the installation of the external conduit in the lines, due to a rupture in the lines which may be caused by an object striking them, etc., requires that the housing and perhaps internal members be repaired. The method of repairing the housing, in the present state of the art, is rather involved, and requires that the outer housing be cut back from the internal housings, and that each internal housing be fitted with a separate collar member that would serve as a juncture adjacent internal housings. Following the placing of the collars on the four individual housings, a separate external collar member must be placed upon the outer housing to form a juncture adjacent the outer housings each of which has been cut away. Therefore, there would remain a gap between the outer housings, which would be course cause a much reduced strength juncture. In addition, in the placing of the individual collar members on the internal housings, each collar member must be glued in place, and therefore after glue is applied and attempts are made to slide the collar members in place, due to the fast gluing action of the PVC pipe, often times collar members are glued in place on one segment of the internal member, but cannot be moved into position to expand over the joint.

The embodiment of the present invention has solved that problem. What is included as seen in FIGS. 5A, 5B, and 5C, a single cut is made across the external housing or casing 516 and internal conduits 12 to separate the length of housing into two separate face to face units. At that point, a spacer 70 is slid into position within each internal conduit 12 to assure that the internal conduit 12 are maintained in position an equal distance apart on both of the segments so that when joined conduits 12 will be face to face.

A modified internal core member 522 is then utilized to maintain the two housings in position and to establish a strengthened juncture. This modified member 522 would not contain the external spacer 26, nor would it contain the internal spacer member 30, for its use. In addition, there would be included a pair of lanyards 100, each of which would be connectibly engaged onto the external central wall of member 522 at point 102, 180° apart, with the end of the flexible lanynards 100 extending out beyond the end portion 540 of the member 522. Member 522 is slidably positioned within one of the external housing 516 over its entire length until end 540 is flush with the end of the housing 516 as seen in FIG. 5A. At this point, since lanyards 100 are of a length greater than 1/2 of the length of the member 22, the end portions of lanyards 100 would be protruding out of housing 516. At this point, the second joint of housing 516 would be place directly in line, as seen in FIG. 5b, with the first housing 516. The the lanyards 100 would then be pulled outward therefore thrusting the member 522 forward (Arrow 104 in FIG. 5C), to be engaged within the second portion of the housing 516 until the lanyards 100 are directly above the end portion 540 of the housing, and at that point, internal member 522 would be positioned in such a manner that each half body would be contained within each housing 516, to form the solid juncture therein as seen in FIG. 5C. It should be noted that since in the cutting of the housings, since internal conduits 12 are likewise cut flush with the external housing 516, the internal stop 30 has been omitted from member 522, since when in final position internal conduits 12 likewise are mating end to end within the bores 14 of each housing 12. Following this procedure, a larger external collar 106 is fitted at the juncture of the housings 516, and is glued in place to serve as an internal sealing member of the joint as seen in the FIGURES.]

Because many varying and different embodiments may be made within the scope of the inventive concept herein taught, and because many modifications may be made in the embodiments herein detailed in accordance with the descriptive requirment of the law, it is to be understood that the details herein are to be interpreted as illustrative and not in a limiting sense.

What is claimed as invention is:

1. Apparatus for joining two longitudinally aligned conduit assemblies in end-to-end relationship, each conduit assembly having a plurality of *smaller diameter* conduits disposed in a *larger diameter* casing, the apparatus comprising:

(a) a *cylindrically shaped body member for joining the conduit assemblies together, the* body member having:

(i) *a first end and a second end;*

(*ii*) an outside diameter [smaller than the inside diameter of the casing] *so that upon assembly of the two longitudinally aligned conduit assemblies, the body member can be contained entirely within the casings;*

[(ii)] (*iii*) a plurality of *tubular* bores, each [bore being shaped to receive an end of a conduit from each conduit assembly,] *extending from the first end to the second end,* each bore having a diameter [greater than] *that can accommodate* the outside diameter of the conduits it [is to receive] *receives upon assembly;* and

[(iii) two ends; and] (*iv*) *a length greater than its outside diameter;*

(b) *an end member having a plurality of bores wherein the bores of the end member correspond to the bores of the body member; and*

(*c*) *a single* flexible gasket means [positioned in the wall of each of the bores at each end of] *secured between the end member and* the body member[,]*; said single flexible gasket means having a plurality of openings corresponding to and having a smaller diameter than the bores of the end member for providing a seal between the body member and the conducts of one of the conduit assemblies, and said single flexible gasket means having an annular portion wherein said annular portion has a diameter larger than the diameter of the body member and is positioned on and around said body member* for providing a seal between the body member and [each of conduits] *the casing of said one of the conduit assemblies.*

[2. The apparatus of claim 1, further comprising:

a gasket member adjacent each end of the body member for providing a seal between the body member and each casing.]

3. The apparatus of claim 1, further comprising:

spacer members for assisting the conduits align with the bores.

4. The apparatus of claim 1, further comprising:

means on the exterior of the body member for restricting longitudinal movement of the body member relative to the casings.

[5. The apparatus of claim 1, wherein the flexible gasket means also provide a seal between the body member and the casing.]

6. The apparatus in claim [5] 1, wherein the [gasket means are secured to the body member with] *end member is a plate* [members] *member.*

[7. Apparatus for joining two conduit assemblies, each conduit assembly including a casing and a plurality of conduits disposed within the casing, the apparatus comprising:

(a) a body member having:

(i) an outside diameter small than the inside diameter of the casing:

(ii) a plurality of bores, each bore being shaped to receive an end of a conduit from each conduit assembly, each bore having a diameter greater than the outside diameter of the conduit it is it receiver; and (iii) two ends; and (b) moving means for longitudinally moving the body member after the body member has been inserted into one of the conduit assemblies and the two conduit assemblies are longitudinally aligned adjacent one another.]

[8. The apparatus of claim 7, wherein:

the moving means comprises lanyard means having two ends, a first end of the lanyard means being secured to the exterior of the body member intermediate the two ends of the body member.]

[9. The apparatus of claim 8, wherein:
the lanyard means has a length greater than the distance between its first end and the end of the body member nearest its first end.]

[10. The apparatus of claim 7, further comprising:
gasket means adjacent each end of the body member for providing a seal between the body member and the conduits.]

[11. The apparatus of claim 7, further comprising:
spacer members for assisting the conduits align with the bores.]

[12. The apparatus of claim 7, wherein the flexible gasket means also provide a seal between the body member and the casing.]

[13. The apparatus of claim 7, wherein the gasket means are secured to the body member with plate members.]

[14. A method of joining two conduit assemblies in an end-to-end relationship, each conduit assembly comprising a casing and a plurality of conduits disposed within the casing, the method comprising:

(a) inserting a body member into the first conduit assembly, the body member including first and second end portions, and having an outside diameter smaller than the inside diameter of the casing, and having a plurality of bores having a diameter larger than the outside diameter of the conduits;
(b) providing sealing means formed in the wall of each of said bores of the first and second end portions of the body portion, for sealably engaging each conduit aligned in each bore;
(c) longitudinally aligning the first and second conduit assemblies;
(d) abutting the first conduit assembly with the second conduit assembly; and
(e) moving the body member to a position in which a first portion of the body member is disposed in the first conduit assembly and a second portion of the body member is disposed in the second conduit assembly.]

[15. The method of claim 14, wherein:
the body member comprises lanyard means having first and second ends, the first end of the lanyard means being attached to the exterior of the body member at a point intermediate the two ends of the body member; and
in step (e), the body member is moved by pulling on the lanyard means until the first end of the lanyard means is positioned adjacent the first conduit assembly and the second conduit assembly.]

[16. The method of claim 15, wherein:
the second end of the lanyard means extends beyond an end of the body member.]

[17. The method of claim 14, wherein:
the sealing means positioned in the wall of each of said bores of the first and second end portions of the body portion further comprises gasket means adjacent each end of the body member for providing a seal between the body member and the conduits.]

[18. The method of claim 14, wherein:
the body member further comprises gasket means adjacent each end thereof for providing a seal between the body member and the casings.]

[19. The method of claim 14, wherein:
the body member further comprises gasket means adjacent each end therefor for providing a seal between the body member and the conduits and between the body member and the casings.]

[20. The method of claim 14, further comprising the step of forming the first and second conduit assemblies by making a cut through a casing in a plurality of conduits.]

21. An apparatus for joining two longitudinally aligned conduit assemblies in end-to-end relationship, each conduit assembly having a plurality of conduits disposed in an exterior casing, the apparatus comprising:

(a) a cylindrical body portion, *being* circular in cross-section, *having a length greater than its diameter,* and positionable within [the] *a first* exterior casing *and a second exterior casing;*
(b) a first end of the cylindrical body portion[, further] comprising a *first* plurality of circular bores, each bore *of the first plurality of circular bores* receiving a conduit as the first end of the cylindrical body portion is positioned within [a] *the* first exterior casing;
(c) a second end of the cylindrical body portion[, further] comprising a *second* plurality of circular bores, each bore *of the second plurality of circular bores* receiving a conduit as the second end of the cylindrical body portion is positioned within [a] *the* second exterior casing; and
(d) [sealing means positioned in the wall of each of said bores of the first and second end portions of the cylindrical body portion, for sealably engaging each conduit positioned in each bore; and
(e) exterior sealing means positioned around the outer surface of the cylindrical body portion for sealing the first and second ends of the cylindrical body portion against the inner wall of the first and second exterior casings, the casings positioned end-to-end encircling the entire cylindrical body portion, the cylindrical body portion defining a uninterrupted pathway within the plurality of conduits aligned end-to-end within the cylindrical body portion] *an end member having a third plurality of bores wherein the bores of the end member correspond to the bores of the first and second pluralities of bores of the cylindrical body portion; and*
*(e) a single flexible gasket means secured between the end member and the cylindrical body portion; said single flexible gasket means having a plurality of openings corresponding to and having a smaller diameter than the bores of the end member for providing a seal between the cylindrical body portion and the conduits at the second end of the cylindrical body portion, and said single flexible gasket means having an annular portion wherein said annular portion has a diameter larger than the diameter of the cylindrical body portion and is positioned on and around said cylindrical body portion for providing a seal between the cylindrical body portion and the first exterior casing.*

[22. An apparatus for joining two longitudinally aligned conduit assemblies in end-to-end relationship, each conduit assembly having a plurality of conduits disposed in an exterior casing, the apparatus comprising:

(a) a cylindrical body portion, circular in cross-section, and positionable within the exterior casing;
(b) a first end of the cylindrical body portion, further comprising a plurality of circular bores, each bore receiving a conduit in sealing relationship with the wall of the bore at a first end of the cylindrical body portion as each conduit is positioned in each bore;

(c) a second end of the cylindrical body portion, further comprising a plurality of circular bores, each bore receiving a conduit in sealing relationship with the wall of the bore at the second end of the cylindrical body portion as each conduit is positioned in each bore; and (d) exterior sealing means positioned around the outer surface of the cylindrical body portion for sealing the first and second ends of the cylindrical body portion against the inner wall of each exterior casing, the casings positioned end-to-end encircling the cylindrical body portion, the cylindrical body portion defining and uninterrupted pathway within the plurality of conduits aligned end-to-end within the cylindrical body portion.]

*23. A conduit assembly system comprising:*

*(a) a first conduit assembly including a first plurality of conduits disposed in a first exterior casing and a second conduit assembly including a second plurality of conduits disposed in a second exterior casing;*

*(b) a cylindrical body portion being circular in cross-section and having a length greater than its diameter, the body portion positioned within the first and second exterior casings;*

*(c) first end of the cylindrical body portion comprising a first plurality of circular bores, each bore of the first plurality of circular bores receiving one of the first plurality of conduits;*

*(d) a second end of the cylindrical body portion comprising a second plurality of circular bores, each bore of the second plurality of circular bores receiving one of the second plurality of conduits;*

*(f) an end member having a third plurality of bores wherein the bores of the end member correspond to the bores of the first and second pluralities of bores of the cylindrical body portion; and*

*(g) a single flexible gasket means secured between the end member and the cylindrical body portion; said single flexible gasket means having a plurality of openings corresponding to and having a smaller diameter than the bores of the end member for providing a seal between the cylindrical body portion and the conduits at the first end of the cylindrical body portion, and said single flexible gasket means having an annular portion wherein said angular portion has a diameter larger than the diameter of the cylindrical body portion and is positioned on and around said cylindrical body portion for providing a seal between the cylindrical body portion and the first exterior casing.*

*24. A system for housing transmission lines, comprising:*

*a) first and second conduit assemblies, each conduit assembly having a plurality of smaller conduits disposed in a large integral section of exterior casing, the casing having an inner wall, the joint having a bell end and a spigot end, with a bell end portion adjacent the bell end and a spigot end portion adjacent the spigot end for connecting with adjacent sections of casing to form overlapping bell-and-spigot connection;*

*b) a cylindrical body portion, having first and second ends and having a length greater than its width, the body portion positionable within the exterior casing, and having a generally cylindrical outer surface, the entire body portion being encapsulated within the casing upon connection of adjacent joints,*

*c) the first end of the cylindrical body portion having a first plurality of circular bores, each bore for receiving a conduit;*

*d) means for forming a seal between each bore at the first end of the cylindrical body portion and a conduit as each conduit is positioned in each bore,*

*e) the second end of the cylindrical body portion having receiving means including a second plurality of bores for receiving a plurality of conduits;*

*f) an end member having a plurality of bores wherein the bores of the end member correspond to the bores of the cylindrical body portion;*

*h) a single flexible gasket means secured between the end member and the cylindrical body portion; said single flexible gasket means having a plurality of openings corresponding to and having a smaller diameter that the bores of the end member for providing a seal between the cylindrical body portion and the conduits, and said single flexible gasket means having an annular portion wherein said annular portion has a diameter larger than the diameter of the cylindrical body portion and is positioned on and around said cylindrical body portion for providing a seal between the cylindrical body portion and the casing; and*

*i) the first and second plurality of bores defining an uninterrupted pathway for communicating with a first and second plurality of the small conduits aligned end-to-end.*

* * * * *